US011606349B2

(12) United States Patent
Brainer

(10) Patent No.: US 11,606,349 B2
(45) Date of Patent: Mar. 14, 2023

(54) AUTHENTICATION TOKEN REFRESH

(71) Applicant: salesforce.com, inc., San Francisco, CA (US)

(72) Inventor: David Brainer, Salida, CO (US)

(73) Assignee: salesforce.com, inc., San Francisco, CA (US)

( * ) Notice: Subject to any disclaimer, the term of this patent is extended or adjusted under 35 U.S.C. 154(b) by 108 days.

(21) Appl. No.: 16/890,531

(22) Filed: Jun. 2, 2020

(65) Prior Publication Data

US 2021/0377248 A1 Dec. 2, 2021

(51) Int. Cl.
*H04L 29/06* (2006.01)
*H04L 9/40* (2022.01)

(52) U.S. Cl.
CPC ................ *H04L 63/083* (2013.01)

(58) Field of Classification Search
CPC . H04L 63/083; H04L 63/0807; H04L 63/108; H04L 67/02
See application file for complete search history.

(56) References Cited

U.S. PATENT DOCUMENTS

| 8,844,013 | B2 | 9/2014 | Vangpat et al. |
| 10,148,522 | B2* | 12/2018 | Ezell ................ H04L 63/083 |
| 10,171,446 | B1* | 1/2019 | Kitchen ............. H04L 63/0807 |
| 10,313,134 | B2 | 6/2019 | Smith et al. |
| 2014/0081685 | A1 | 3/2014 | Thacker et al. |
| 2015/0163061 | A1 | 6/2015 | Gupta |
| 2019/0007421 | A1* | 1/2019 | D ....................... H04L 63/0807 |
| 2019/0230169 | A1* | 7/2019 | Elangovan ............. H04L 67/01 |

OTHER PUBLICATIONS

Windows CE Win32 API programming, Radtke, 1998 (Year: 1998).*
Token-based sequential consistency in asynchronous distributed systems, Raynal, Jan. 2003 (Year: 2003).*

* cited by examiner

*Primary Examiner* — Jahangir Kabir
(74) *Attorney, Agent, or Firm* — Kowert, Hood, Munyon, Rankin & Goetzel, P.C.

(57) ABSTRACT

Techniques are disclosed relating to authentication token refresh. In various embodiments, a first of a plurality of instances of an application executing on the server system receives a request to provide content to a browser of a client device. The first application instance determines that an authentication token useable to provide the content has expired. The authentication token is maintained in a storage accessible to the plurality of application instances. The first application instance sends a refresh request for the authentication token to an authentication service. In response to the authentication service denying the refresh request, the first application instance waits for a particular period of time before checking the storage to determine whether another instance of the plurality of instances of the application has refreshed the authentication token.

20 Claims, 10 Drawing Sheets

AUTHENTICATION TOKEN REFRESH

BACKGROUND

Technical Field

This disclosure relates generally to computer security, and, more specifically, to token-based authentication.

Description of the Related Art

When a web browser on a client device makes a request for a particular service from a server system, the request from the client device may be handled by a software application on the server system that may need to access a specific resource on the server system to provide the requested service. To protect the security of the resource, the user of the client device may need to be authenticated on the server system before access to the particular resource is granted to the server application. A token-based authentication system may be used as one approach for allowing users to enter their username and password on the browser of the client device in order for the server application to obtain an authentication token from an authentication service on behalf of the user to enable use of the resource.

Figure 1:
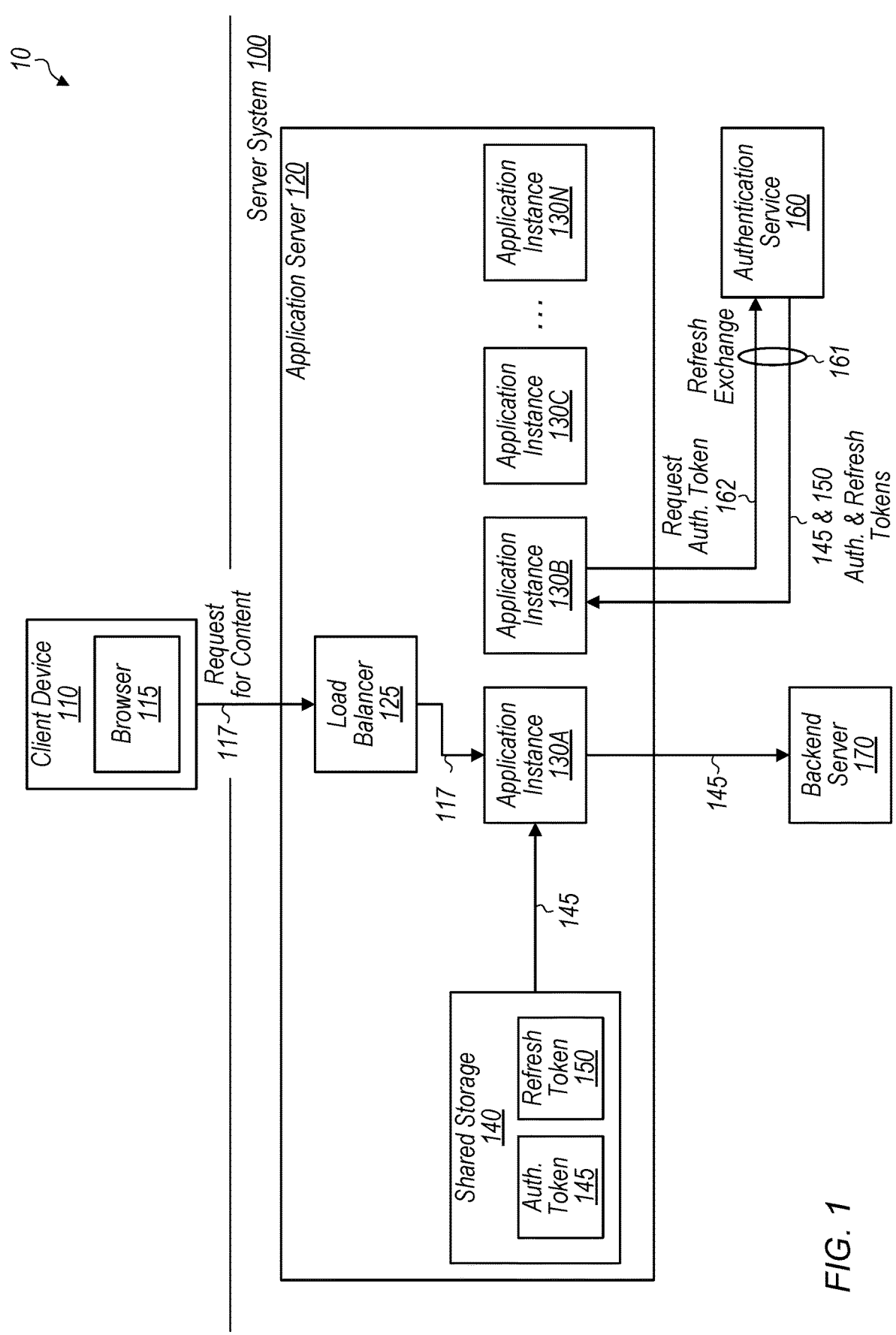
FIG. 1 is a block diagram illustrating example elements of a system for authentication token refresh, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "application server configured to provide services, such as data storage, data retrieval, and data manipulation" is intended to cover, for example, a computer system that has hardware (e.g., processors, memory storing program instructions, network interface card, etc.) that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

A modern server system in a client-server architecture typically supports handling high volumes of web traffic by relying on multiple redundant components and assigning specific functions to dedicated components. For example, a server system may execute multiple instances of a front-end application that are each capable of interfacing with multiple client browsers in parallel. The server system, however, may have a shared backend dedicated, for example, to storing data that is used to facilitate delivering web content being served by an instance of the front-end application. For example, a front-end application instance may be serving, to a browser, a user interface that includes a chart generated from a user's data stored in the backend.

As a server system may be communicating with multiple clients having multiple users, a server system may want to authenticate a user before enabling requested functionality or before granting access to some resource associated with the user. To avoid overly burdening the user, an authentication token may be generated by an authentication service after a user supplies an authentication credential to an application instance. This token may then be communicated between components within the server system that are working to service requests from the user's browser in order to attest that the user has already been authenticated. For example, the application instance supplying the user interface with the chart may present the authentication token to the backend to receive the user's data for generating the chart.

Authentication tokens are typically valid for only a specified period in order to reduce the potential exposure that can occur if an unauthorized actor obtains an authentication token. When multiple application instances are used, one approach to handling the refreshing is to employ a "sticky session" in which a browser communicates with only a single one of the application instances throughout the entire browser's session. This approach, however, is problematic as it may be desirable during a browser session to transition a browser from interfacing with one application instance to another application instance in order to balance workloads across application instances. For example, if a user interface with multiple charts, tables, images, etc. is being served to a browser, it may make sense to distribute creating these visual elements among multiple ones of the application instances, which may each have a copy of the authentication token in order to obtain user data for creating these visual elements. Allowing each of these application instances to potentially refresh its copy of the authentication token may also be problematic, however, as doing so may produce one or more race conditions.

The present disclosure describes a system for refreshing an authentication token in a manner that allows a browser to transition among multiple application instances while reducing the potential for problematic race conditions. As will be described in greater detail below, in various embodiments, an authentication token is maintained in a shared storage accessible to multiple application instances. If a first of the application instances determines that the authentication token has expired (e.g., based on a timestamp included in the token) and is able to successfully have an authentication service refresh the token, the first application instance can store the new, refreshed authentication token in the shared storage to make it available to the other application instances. If, in the interim, a second of the application instances also determines that the authentication token has expired but fails to refresh the authentication token (e.g., because the authentication service already performed the refresh and, in some embodiments, permits only a single refresh), the second application instance can wait for a particular period of time before checking the storage to determine whether another application instance has already refreshed the authentication token and put it in the storage.

Turning now to FIG. 1, a block diagram of a system 10 for authentication token refresh is shown. In the illustrated embodiment, system 10 includes a server system 100 and a client device 110. Server system 100 includes an application server 120, an authentication service 160, and a backend server 170. As further illustrated, application server 120 includes a load balancer 125, multiple instances of an application 130A-N that execute on the application server 120 and a shared storage 140 on the application server 120. In some embodiments, system 10 may be implemented differently than illustrated. For example, authentication service 160 may be part of either the application server 120 or the backend server 170, more (or less) components may be included, etc.

Server system 100, in some embodiments, is a computing system that implements a platform allowing users to develop, run, and manage applications. As an example, server system 100 may be a cloud computing system that provides a sales or marketing automation and analytics application. In some embodiments, server system 100 may be a multi-tenant system that provides various functionality to a plurality of users/tenants hosted by the multi-tenant system. Accordingly, server system 100 may execute software from various, different users (e.g., providers and tenants of server system 100) as well as provide code, web pages, and other data to users. As depicted, server system 100 may interact with one or more client devices 110 via an application server 120, which in turn communicates with a backend server 170 maintaining data for users that are associated with server system 100.

Client device 110, in various embodiments, is a computing device that allows a user of the client device 110 to access, store, and manipulate data, which may be obtained from server system 100. Accordingly, client device 110 may include supporting software that allows operations (e.g., accessing, storing, displaying, etc.) on data generated or received by client device 110. Examples of a client device 110 include, but are not limited to, consumer devices such as a smartphone, a personal computer system, a desktop computer, laptop or notebook computer, mainframe computer system, tablet computer, handheld computer, workstation, network computer, a music player, or personal data assistant (PDA). Client device 110 may also include persistent storage to store data persistently, or may interface with a storage device (not shown) which may be a database or a cloud storage device to facilitate persistent storage.

Browser 115, in various embodiments, is a software application that allows a user of the client device 110 to access information on a web server. When a user requests a particular website, the browser 115 retrieves the corresponding content from a web server hosting the webpage and then displays the resulting webpage on the display screen of the client device 110. As part of presenting the website, in some embodiments, browser 115 may send requests 117 for the retrieval of content stored in a database maintained by backend server 170 or may send requests 117 for the performance of a particular service by a backend server 170 (which will be described in greater detail below in various embodiments). In various embodiments, browser 115 sends one or more requests 117 to an application server 120, with which the client device 110 is connected via a communication interface. In some instances, the browser 115 on the client device 110 may initiate multiple requests 117 almost simultaneously to the application server 120. For example, in response to a user request to load a particular webpage, the browser may execute multiple scripts to simultaneously load charts, tables, images, or text in different parts of the display screen of the client device, during the process of rendering the requested webpage on the display screen of the client device 110.

Application server 120, in various embodiments, is a computing system configured to provide services, such as data storage, data retrieval, and data manipulation. As shown, the application server 120 receives a request 117 for content and/or service from the browser 115. To facilitate servicing request 117 along with requests from other devices in parallel, the application server 120 may execute multiple instances 130 of an application operable to process received requests 117. To ensure an even distribution across each application instance 130, the application server 120 may further include a load balancer 125 to initially receive incoming requests 117 from browsers 115 and appropriately route the requests 117 to ones of applications instances 130.

Load balancer 125, in various embodiments, is a software application that ensures that the requests 117 from the browser 115 are distributed to the application instances 130 based on the relative workloads of the application instances 130. In doing so, load balancer 125 may ensure that no one application instance 130 becomes a bottleneck in handling requests 117 from the browser 115 and that there is a balance in the workloads of all application instances 130.

Application instances 130, in various embodiments, are software components that handle interfacing with browsers including servicing requests 117 from the browser 115. Accordingly, in some embodiments, instances 130 may include a web server component (e.g., Apache HTTP Server™, Nginx®, etc.) in order to serve content to browser 115 via the hypertext transfer protocol (HTTP). Instances 130 may also facilitate generation of various content such as providing sales- or marketing-automation and analytics content. As part of generating this content, application instances 130 may interface with backend server 170, which may store data used to generate the content. Also, this generated content may be provided by multiple instances 130 simultaneously to the same browser 115 such as instance 130A providing a chart and instance 130B providing a table for inclusion in a user interface being rendered by browser 115. As content being served by applications instances 130 may include confidential, user-specific data, a user may be authenticated in order to ensure that a user is receiving his or her data. Rather than perform a user authentication locally, the application instances 130 may interface with the authentication service 160.

Authentication service 160, in various embodiments, is hardware, software, or a combination thereof capable of performing an authentication of the user of the client device 110. When browser 115 is requesting content, an application instance 130 may serve a web page including an authentication prompt to a user and pass on the received authentication credentials (for example, a username and password combination) to the authentication service 160 for validation. In response to a successful validation, the authentication service 160 may issue a corresponding attestation of the successful validation in the form of returning an authentication token 145. In some embodiments, authentication service 160 signs the authentication token with a private key of a public-key pair and distributes the corresponding public key to application instances 130 and backend server 170 to enable them to verify the token 145. In others embodiments, authentication service 160 may sign the authentication token 145 using a keyed-hash (e.g., HMAC) and validate the token 145 itself when requested by application instances 130 or backend server 170.

Backend server 170, in various embodiments, is a computing system configured to provide access to a specific resource that may be used by an application instance 130 in responding to a request 117. In some embodiments, this resource may be a user's data stored in a database maintained by backend server 170. In some embodiments, this resource may be a service provided by (or performed by) backend server 170. For example, if an application instance 130 is serving content for an online storefront, backend server 170 may provide a payment service that allows a user to initiate a transaction to pay for a product in response to a request 117 from browser 115. Before granting access to this specific resource, backend server 170 may want to establish that a user associated with a received request 117 has been successfully authenticated. Thus, an application instance 130 may provide an authentication token 145, which backend server 170 may verify before granting access the resource.

As application instances 130 use an authentication token 145 to interfacing with backend server 170, the token 145 may expire after some period of being issued by authentication service 160. This temporary validity period may be used in order to reduce the security exposure if an unauthorized actor obtains access to a token 145 and/or to cause application instances 130 to periodically check in with authentication service 160 to confirm that a user is still authorized to use the specific resource. As shown, if an application instance 130 determines that the authentication token 145 has expired, then the application instance 130 may perform a "refresh" exchange 161 in which the application instance 130 sends a request 162 for a new/refreshed authentication token 145. In order to prevent having to repeatedly ask the user of his or her credentials, service 160 may provide a refresh token 150 when authentication token 145 is initially obtained. The refresh token 150 may be redeemable for another new authentication token 145 in lieu of providing the user's credentials. Accordingly, in some embodiments, when making a request 162 for a new authentication token 145, an application instance 130 may provide the corresponding refresh token 150. In response to a successful verification of refresh token 150, authentication service 160 may return a new authentication token 145—and, in some embodiments, may return a new refresh token 150 to facilitate a subsequent refresh.

As noted above, however, a problem may arise when multiple application instances 130 using the same authentication token 145 simultaneously determine that the token 145 has expired and issue multiple refresh requests—potentially causing one or more race conditions with uncertain outcomes. For example, in some embodiments, the authentication service 160 may permit only a single use (or limited number of uses) of a refresh token 150 such that the authentication service 160 may accept only a single one (or limited number) of the refresh attempts made by an application instance 130 and deny the refresh requests of other application instances 130. As a result, only one application instance 130 may end up with the authentication token 145 while other instances 130 may end up returning error to the user as they are unable to obtain a refreshed authentication token 145. As another example, in some embodiments, authentication service 160 may permit only one outstanding valid token 145 at a given time—thus, an application instance 130 may receive a valid authentication token 145 and have it immediately invalidated by the refresh exchange 161 of another application instance 130.

To address these technical problems, in the illustrated embodiment, an application instance 130 that is successful in obtaining an authentication token 145 places it (along with any received refresh token 150) in a shared storage 140 within application server 120. The shared storage 140 is accessible to each application instance 130 in order to make the authentication token 145 available to the other instances 130. If multiple application instances 130 determine around the same time that an authentication token 145 has expired and attempt to refresh the token 145, an application instance 130 that is unsuccessful in refreshing the authentication token 145 can check the shared storage 140 (potentially after waiting for some period in some embodiments) to determine whether another application instance 130 has successfully refreshed the authentication token 145 and placed it in the storage 140. In some embodiments, the waiting and checking of storage 140 may be performed for a configurable number of retries if an application instance 130 is initially unsuccessful in locating a refreshed authentication token 145. If, however, a refreshed authentication 145 has been found in storage 140, the first application instance 130 may then use the refreshed authentication token 145 from the storage 140 to handle the request 117 from the browser 115. As will be discussed below with respect to FIG. 4, in some embodiments, an application instance 130 may use an enhanced method of saving the authentication token 145 and the refresh token 150 back to the shared storage 140 after a successful refresh attempt to prevent potentially stale information about the tokens from overwriting valid tokens in the shared storage 140.

These techniques may reduce the potential for the problematic race conditions as, for example, an application instance 130 is able to obtain access to refreshed authentication token 145 even if it was not the one who successfully refreshed the token 145. These techniques may reduce the potential load on system 100 as repeated refresh failures may results in applications instances 130 repeatedly requesting tokens 145 from authentication service 160 and potentially resulted in the browser 115 repeating the request 117 until the request may be successfully handled—and causing a delay in presenting requested information on the user interface of the browser 115. These techniques may also be advantageous over prior approaches such as the "sticky session" approach discussed above by allowing multiple application instances 130 to assist in serving browser 115 in parallel to enable better system throughout and performance and better scalability.

Various examples involving the use of authentication token 145 and refresh token 150 will now be discussed in more detail with respect to FIGS. 2A-2C. Initially, an authentication token usage and a successful authentication token refresh will be discussed with respect to FIGS. 2A and 2B in order to better understand how an unsuccessful authentication token refresh is handled as discussed with respect to FIG. 2C.

Figure 2A:
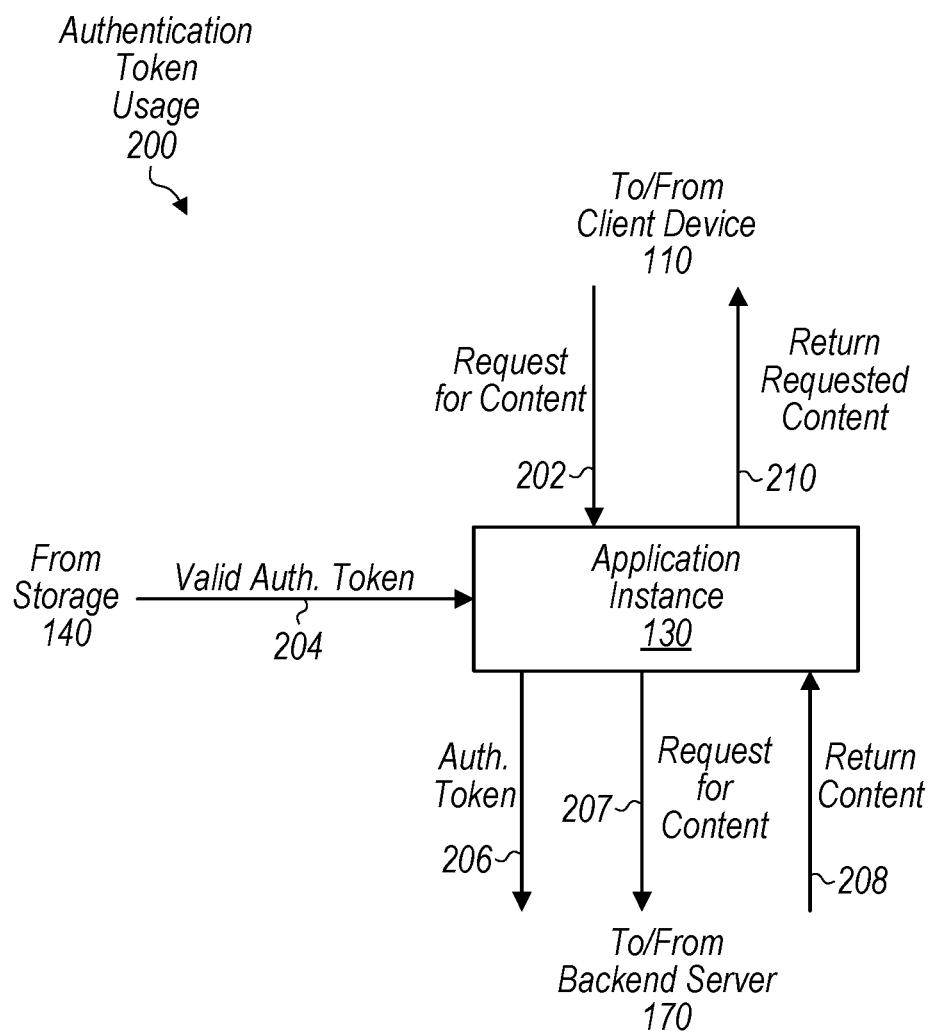
FIG. 2A is a block diagram illustrating an example of authentication token usage, according to some embodiments.

Turning now to FIG. 2A, a block diagram of an example of authentication token usage 200 is shown. In the illustrated embodiment, usage 200 may be performed when a valid authentication token 145 in the shared storage 140 is available to obtain requested content and includes the performance of steps 202-210. As shown, at step 202, a request 117 for content from the client device 110 (or more specifically browser 115) is sent to application server 120, which routes the request 117 to a given application instance 130. At step 204, the application instance 130 checks the storage 140 and obtains a valid authentication token 145. At step 206, the application instance 130 presents the authentication token 145 obtained at step 204 to the backend server 170, accompanied by a forwarding of a request for content to the backend server 170 at step 207. In some embodiments, the request for content to the backend server may be the same as the request 117 for content that the application instance 130 received from the browser 115, whereas in some other embodiments, the request for content to the backend server may be different from request 117. In response to a successful verification of the authentication token 145, the backend server 170 returns the requested content at step 208. At step 210, the application instance 130 passes on the requested content to the client device 110, thus, completing the handling of the request for content that originated at step 202.

Figure 2B:
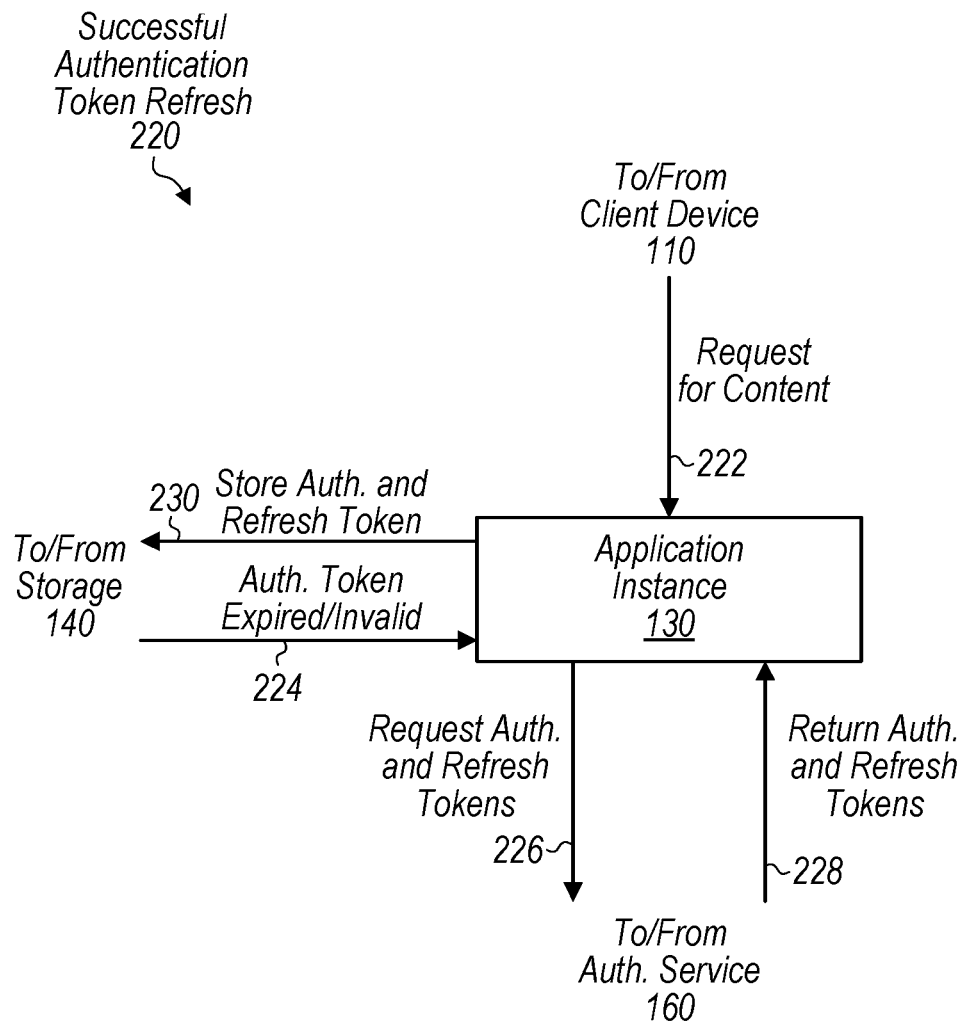
FIG. 2B is a block diagram illustrating an example of a successful authentication token refresh, according to some embodiments.

Turning now to FIG. 2B, a block diagram of an example of a successful authentication token refresh 220 is shown. In the illustrated embodiment, refresh 220 may be performed when an authentication token has expired, and includes the performance of steps 222-230. As shown, at step 222, a request 117 for content from the client device 110 is sent to application server 120 for processing by a given application instance 130. At step 224, the application instance 130 checks the storage 140 and determines that the authentication token in the storage 140 has expired. The application instance 130 retrieves the refresh token 150 from the storage 140 upon determining that the authentication token 145 warrants being refreshed. At step 226, the application instance 130 presents a request to refresh the authentication token to the authentication service 160, while forwarding the refresh token retrieved from the storage 140 at step 224. At step 228, the authentication service 160 provides a refreshed authentication token 145 and, in some embodiments, a new refresh token 150 to the application instance 130. At step 230, the application instance 130 saves the refreshed authentication token 145 and the refresh token 150 to the shared storage 140 to enable all of application instances 130 to have access to a valid authentication token/refresh token combination.

Figure 2C:
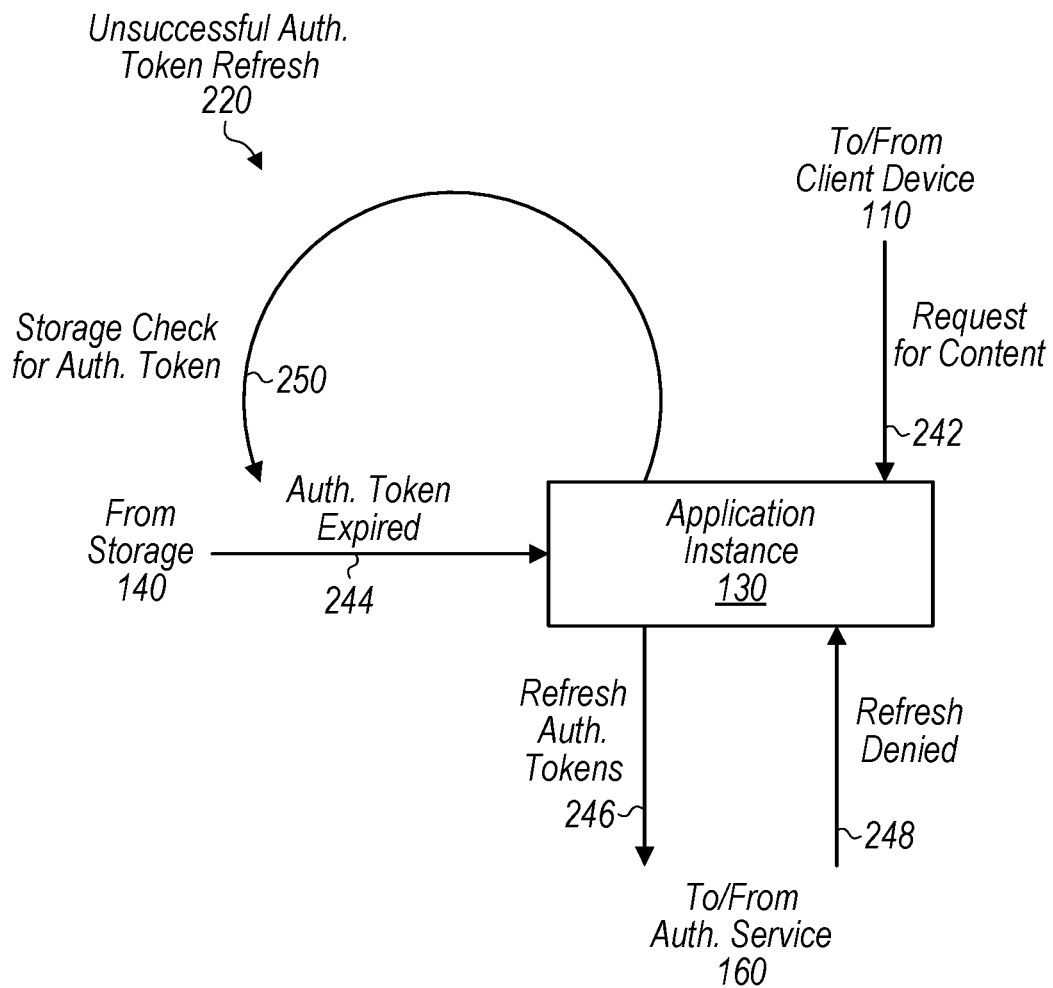
FIG. 2C is a block diagram illustrating an example of an unsuccessful authentication token refresh, according to some embodiments.

Turning now to FIG. 2C, a block diagram of an example of an unsuccessful authentication token refresh is shown. In the illustrated embodiment, refresh 220 may be performed when an attempt to refresh an expired authentication token results in the authentication service denying the request for a new authentication token and includes the performance of steps 242-250. As shown, at step 242, a request for content from the client device 110 is received by the application server (specifically, the request is sent by browser 115 of the client device 110, and is shown to be received by the first application instance 130 on the application server 120). At step 244, the first application instance 130 checks the storage 140 and determines that the authentication token in the storage 140 has expired and therefore, the authentication token needs to be refreshed. The first application instance 130 also retrieves the refresh token from the storage 140 upon determining that the authentication token needs to be refreshed. At step 246, the first application instance 130 presents a request to refresh the authentication token to the authentication service 160, while forwarding the refresh token that had been retrieved from the storage 140 at step 244. At step 248, the authentication service 160 denies the request to refresh the authentication token to the first application instance 130. In one embodiment, the denial at step 248 may be due to the authentication service being presented with a refresh token that had been used within a configurable time period by another application instance other than 130 to successfully obtain a refreshed authentication token (which may have occurred in a manner similar to the successful authentication token refresh depicted in FIG. 2B above). One reason for denying the refresh of the authentication token at step 248 may be to limit potential damage caused by a replay attack whereby a rogue user may try to use a hacked refresh token to obtain multiple authentication tokens. At step 250, the first application instance 130 refrains from further refresh attempts with the authentication service 160. Rather, at step 250, the first application instance 130 checks the authentication token in the shared storage 140 for a configurable number of retries (with a wait between retries) to determine whether the authentication token has been refreshed in the shared storage by some other application instance other than first application instance 130.

In some embodiments, the wait between retries may be fixed, while in some other embodiments, the wait between retries may be variable.

Figure 3:
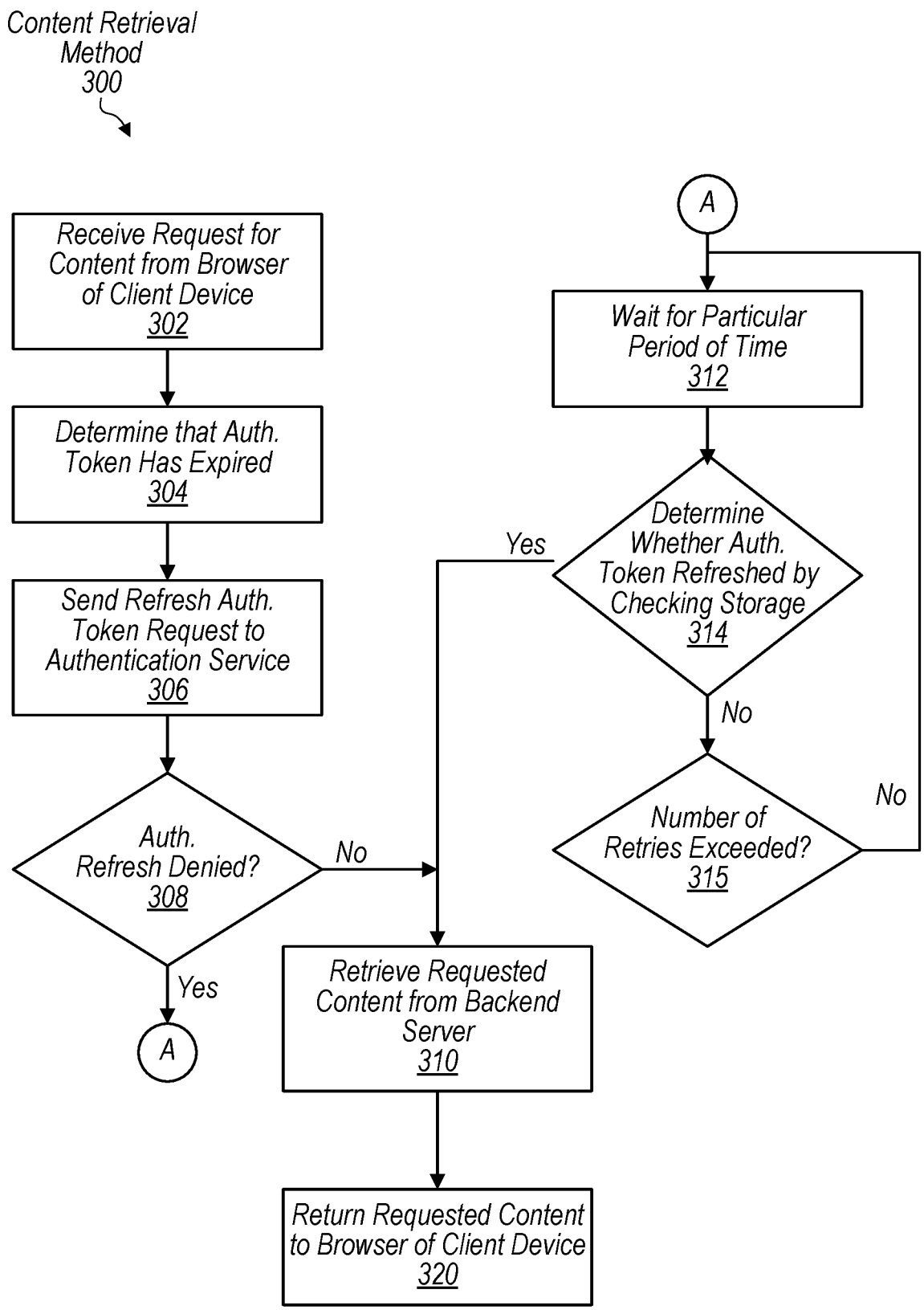
FIG. 3 is a flowchart of an example content retrieval method, according to some embodiments.

Turning now to FIG. 3, a flowchart of an example content retrieval method 300 is shown. In various embodiments, method 300 may be performed by an application instance 130 after it has been chosen by the load balancer 125 to handle the request 117 for content received from the browser 115 of the client device 110.

In the illustrated embodiment, at step 302, the request 117 for content from the browser 115 of the client device 110 is received. At step 304, the application instance 130 checks the shared storage 140 and determines that the authentication token in the storage 140 has expired and warrants being refreshed with the authentication service 160. The application instance 130 retrieves the refresh token stored in the shared storage 140 at step 304, because the refresh token is to be presented to the authentication service 160 in order to obtain a new authentication token.

At step 306, the application instance 130 sends a refresh request for the authentication token to the authentication service 160. The request at this step is accompanied by the retrieved refresh token from the shared storage 140.

At step 308, the application instance 130 determines whether the authentication refresh attempt at step 306 has been denied. If not denied (that is, the authentication token was refreshed successfully), then at step 310, the application instance 130 uses the refreshed authentication token to retrieve the requested content from the backend server 170. At step 310, the application instance 130 retrieves the requested content from the backend server 170. On the other hand, if the authentication token refresh attempt had been denied, then at step 312, the application instance 130 waits for a particular period of time before proceeding to the next step. At step 314, the application instance 130 checks whether the authentication token in the shared storage 140 has been refreshed by another application instance 130 (by following the steps depicted in FIG. 2B above). At step 315, upon determining that the authentication token has still not been refreshed, the application instance 130 determines whether a configurable number of retries has been exceeded. If not, then the application instance 130 goes back to step 312 to continue to wait for the authentication token to be refreshed by another instance 130 of the application. Instead, if the determination at step 314 is that the authentication token has been refreshed by another instance 130 of the application then the application instance 130 executes the same action as previously described at step 310. Upon retrieving requested content at step 310, the application instance 130 proceeds to step 320, where the requested content is returned by the application instance 130 to the browser 115 of the client device 110.

Figure 4:
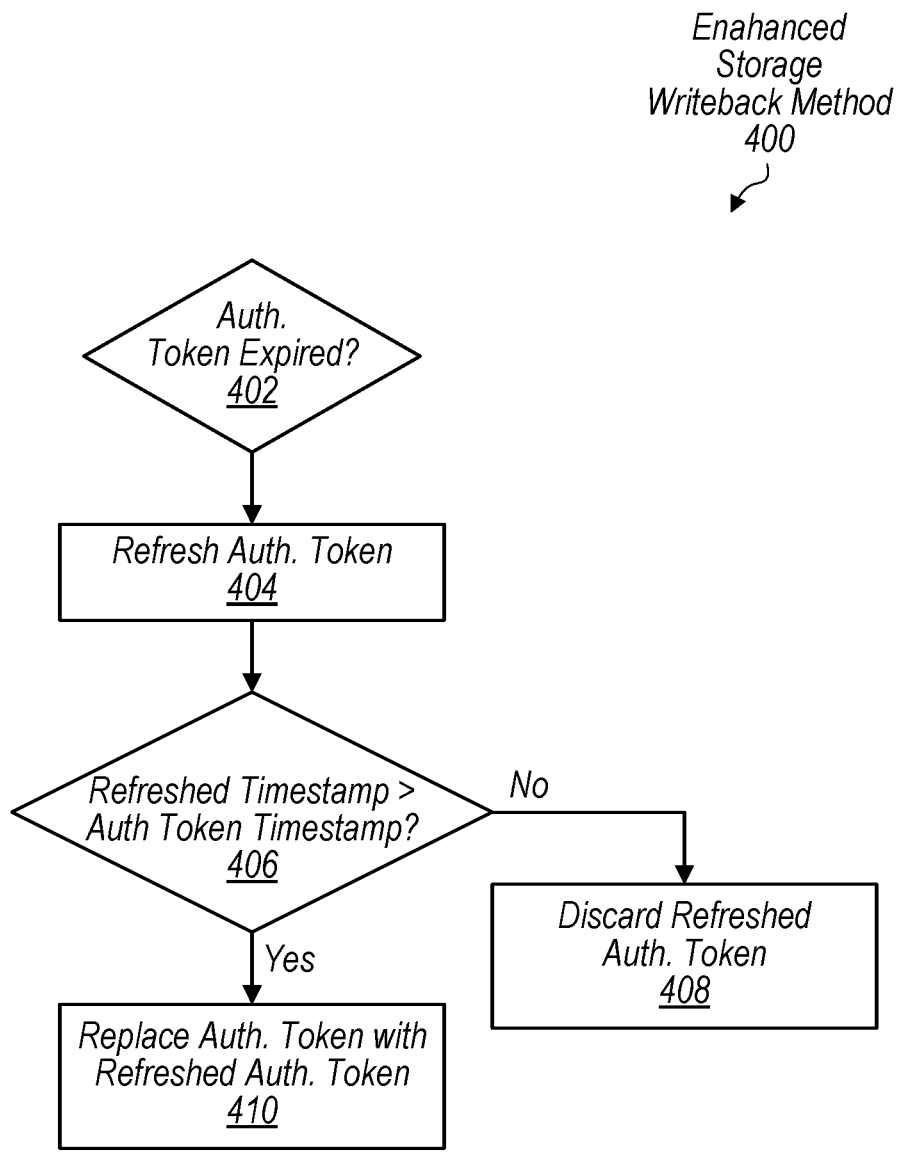
FIG. 4 is a flowchart of an example method for an enhanced storage writeback method, according to some embodiments.

Turning now to FIG. 4, a flowchart of an example method 400 for an enhanced storage writeback is shown. In various embodiments, method 400 may be performed by an application instance 130 after it has been chosen by the load balancer 125 to handle the request 117 received from the browser 115. The application instance 130 may initially store a refreshed authentication token (and possibly, a refresh token) locally and then write the local copy back to storage 140, but may check the copies of the tokens in the storage 140 beforehand to prevent overwriting a newer token.

At step 402, the application instance 130 determines by checking the shared storage whether the authentication token has expired. If expired, then the application instance 130 proceeds to step 404, where the application instance 130 sends a refresh request to the authentication service 160. At step 404, it is assumed that the refresh attempt was successful, and execution proceeds to step 406. At step 406, the expiration timestamp in the refreshed authentication token is compared to the expiration timestamp in the authentication token 145 in the shared storage 140. In some embodiments, a comparison of the expiration timestamp of the refresh token is performed against the expiration timestamp of the refresh token 150 in the shared storage 140, in case the authentication service 160 returns a new refresh token during the authentication token refresh attempt at step 404. If the expiration timestamp of the refreshed authentication token and/or the refresh token are later in time than the expiration timestamp for the corresponding token in the shared storage 140, then at step 410, the application instance 130 updates the authentication and refresh tokens in the shared storage 140 with the newly refreshed tokens obtained at step 406. In one embodiment, the application instance 130 may successfully refresh the authentication token at step 406, without the refresh token being refreshed by the authentication service 160.

In some embodiments, if the application instance 130 runs for a long time after obtaining the refreshed authentication token but before performing the comparison at step 406, then it may be possible for another application instance 130 to also succeed in refreshing the authentication token from the authentication service 160 before the application instance 130 has saved the refreshed authentication token and/or the refresh token to the shared storage 140. This scenario may be possible if the authentication service allows the same refresh token to be used to obtain a new authentication every time a non-expired refresh token is presented to the authentication service 160. In such a case, the later successful authentication refresh attempt may have resulted in a new refresh token being provided to the other application instance 130, since the timing of renewal of the refresh token may be controlled by the authentication service 160 and not the by application instances 130. If another application instance 130 saves the authentication and refresh tokens in the shared storage 140 first, then the comparison at step 406 may reveal that the expiration timestamp of the refresh token in the shared storage is later in time than the expiration timestamp of the refresh token currently held by the application instance 130 in memory that is external to the shared storage 140. In that case, at step 408, the application instance 130 may discard the recently refreshed authentication token and/or refresh token without saving them into the shared storage 140 in order to prevent a later expiring (and therefore, valid) token being overwritten by a stale token (which may have been revoked by the authentication service 160). The enhancement provided by the method 400 thereby prevents a type of race condition from occurring whereby a stale authentication token may overwrite a valid authentication token.

Figure 5A:
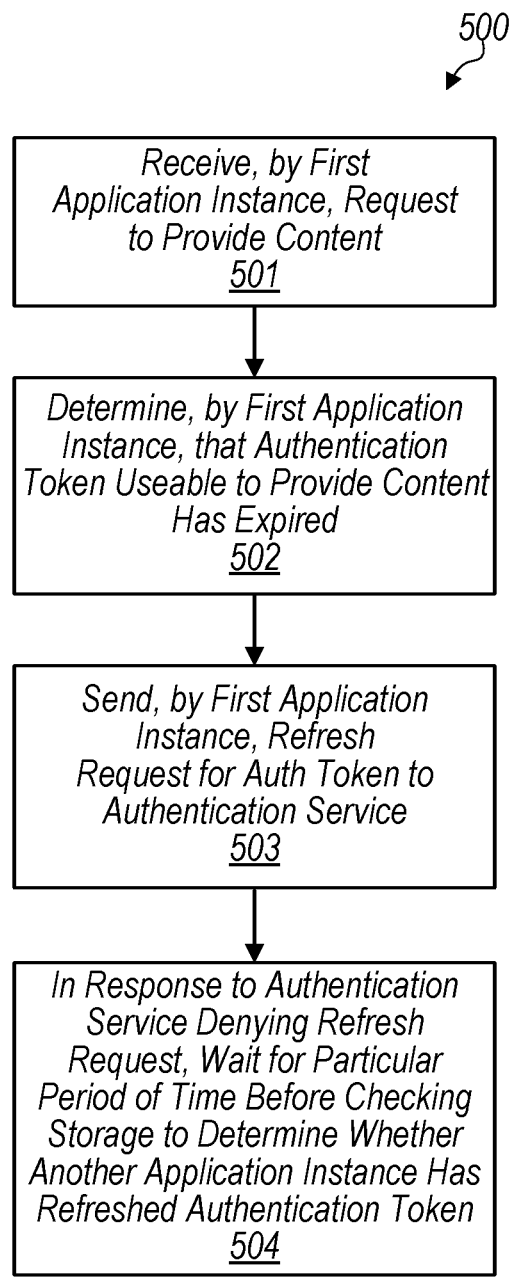
FIGS. 5A-C are flow diagrams of example methods, according to some embodiments.

Turning now to FIG. 5A, a flow diagram of a method 500 is shown. In some embodiments, method 500 is performed by any one of the application instances 130 executing on a server system 100. In some embodiments, method 500 may be performed by executing a set of program instructions stored on a non-transitory computer-readable medium.

Method 500 begins at step 501 with a first of a plurality of application instances receiving a request (e.g., content request 117) to provide content to a browser (e.g., browser 115) of a client device (e.g., client device 110). At step 502, the first application instance determines that an authentication token (e.g., authentication token 145) useable to provide the content has expired. In various embodiments, the authentication token is maintained in a storage (e.g., storage 140) accessible to the plurality of application instances. At step 503, the first application instance sends a refresh request for the authentication token to an authentication service (e.g., authentication service 160). At step 504, in response to determining that the authentication service has denied the refresh request, the first application instance waits for a particular period of time before checking the shared storage to determine whether another instance of the application has refreshed the authentication token.

Figure 5B:
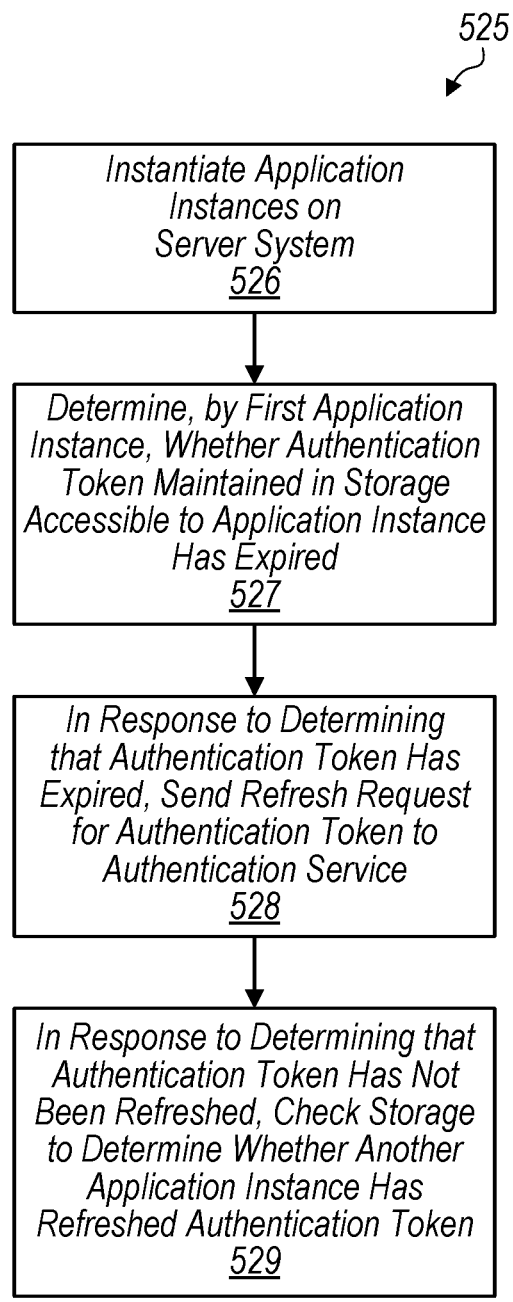

Turning now to FIG. 5B, a flow diagram of a method 525 is shown. In some embodiments, method 525 is performed by any one of the application instances 130 executing on a server system 100. In some embodiments, method 525 may be performed by executing a set of program instructions stored on a non-transitory computer-readable medium.

Method 525 begins at step 526 by instantiating a plurality of application instances that are operable to serve content to a browser (e.g., browser 115) of a client device communicating with the server system. At step 527, the first application instance determines whether an authentication token (e.g., token 145) usable by the plurality of application instances to obtain content from a database (e.g., a database associated with backend server 170) has expired. At step 528, in response to determining that the authentication token has expired, the first application instance sends a refresh request for the authentication token to an authentication service (e.g., authentication service 160). At step 529, in response to determining that the authentication service has not been refreshed by the authentication service, the first application instance checks the storage (e.g., shared storage 140) to determine whether another instance of the application has stored a refreshed authentication token in the storage.

Figure 5C:
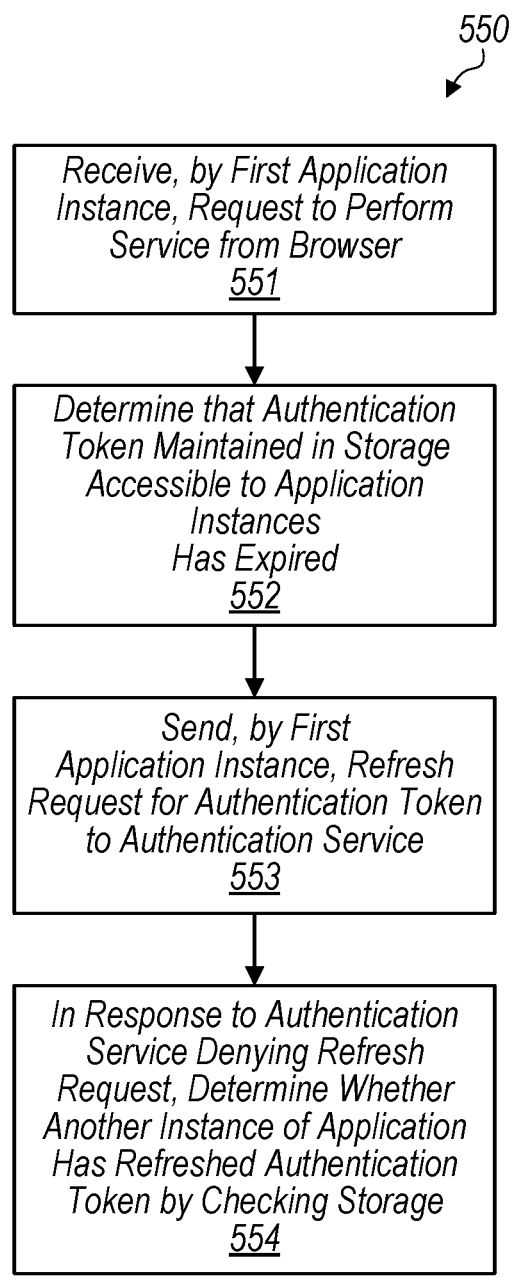

Turning now to FIG. 5C, a flow diagram of a method 550 is shown. In some embodiments, method 550 is performed by any one of the application instances 130 executing on a server system 100. In some embodiments, method 550 may be performed by executing a set of program instructions stored on a non-transitory computer-readable medium.

Method 550 begins at step 551 with the first application instance receiving a request (e.g., request 117) to perform a service from a browser (e.g., browser 115) of a client device (e.g., client device 110). At step 552, the first application instance determines whether an authentication token useable to provide the service has expired. In various embodiments, the authentication token is maintained in a storage (e.g., shared storage 140) accessible to the plurality of application instances. At step 553, the first application instance sends a refresh request for the authentication token to an authentication service (e.g., authentication service 160). At step 554, in response to determining that the authentication service has denied the refresh request for the authentication token, the first application instance determines whether another instance of the plurality of instances of the application has refreshed the authentication token by checking the storage.

Exemplary Computer System

Figure 6:
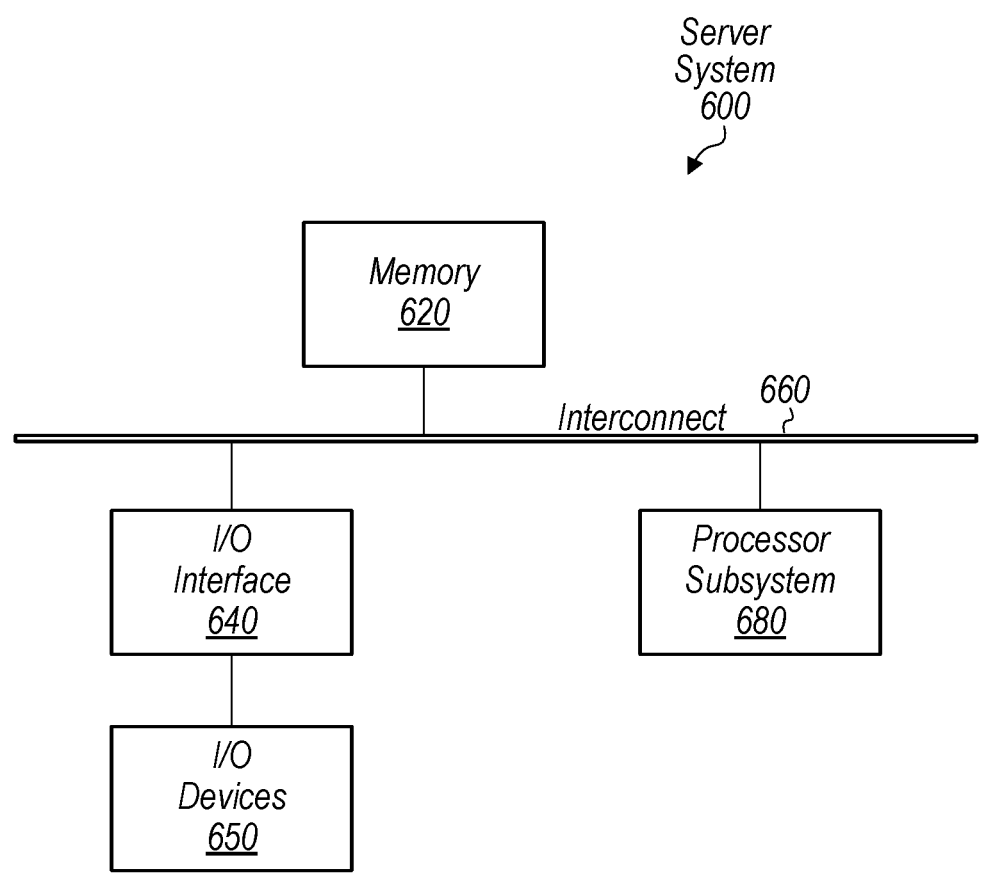
FIG. 6 is a block diagram illustrating an example computer system, according to some embodiments.

Turning now to FIG. 6, a block diagram of an exemplary computer system 600, which may implement server system 100, application server 120, authentication service 160 and/or a backend server 170, is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement application instances 130, an authentication service 160, a backend server 170, and a shared storage 140 to store an authentication token 145 and a refresh token 150 may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over Wi-Fi Bluetooth®, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are capable of causing a server system to perform operations comprising:
   receiving, by a first application instance of a plurality of instances of an application executing on the server system, a request to provide content to a browser of a client device;
   determining, by the first application instance, that an authentication token useable to provide the content has expired, wherein the authentication token is maintained in a storage accessible to the plurality of application instances;
   sending, by the first application instance, a refresh request for the authentication token to an authentication service;
   in response to the authentication service denying the refresh request, waiting, by the first application instance, for a particular period of time before checking the storage to determine whether another instance of the plurality of instances of the application has refreshed the authentication token;
   sending, by the first application instance after waiting the particular period of time, a second refresh request to the authentication service;
   comparing, by the first application instance, a refresh expiration timestamp of a refreshed authentication token received from the authentication service in response to the second refresh request with a stored expiration timestamp of a refreshed authentication token stored by a second application instance in the storage accessible to the plurality of application instances; and
   in response to the refreshed expiration timestamp being earlier in time than the stored expiration timestamp, discarding, by the first application instance, the refreshed authentication token received from the authentication service based on the second refresh request.

2. The non-transitory computer readable medium of claim 1, wherein the operations further comprise:
   in response to determining that the authentication token has been refreshed by another instance of the plurality of instances of the application:
      retrieving, by the first application instance, the refreshed authentication token from the storage;
      sending, by the first application instance, the retrieved authentication token with a request for the content to a backend server; and
      providing, by the first application instance, the content from the backend server to the browser of the client device.

3. The non-transitory computer readable medium of claim 1, wherein the operations further comprise:
   prior to the first application instance receiving the request, receiving the request at a load balancer of the server system; and
   determining, by the load balancer, to distribute the request to the first application instance for processing.

4. The non-transitory computer readable medium of claim 1, wherein the operations further comprise:
   prior to the first application instance receiving the request for content:
      receiving, by the second application instance, user credentials from the browser of the client device;
      presenting, by the second application instance, the user credentials to the authentication service;
      in response to a successful verification of the user credentials, receiving, by the second application instance from the authentication service, the authentication token and a refresh token, wherein the refresh token is useable to refresh the authentication token in response to an expiration of the authentication token; and
      storing, by the second application instance, the authentication token and the refresh token in the storage accessible to the plurality of application instances.

5. The non-transitory computer readable medium of claim 4, wherein sending the refresh request includes:
   presenting, to the authentication service, the refresh token maintained in the storage accessible to the plurality of application instances.

6. The non-transitory computer readable medium of claim 1, wherein the operations further comprise:
   refreshing, by the second application instance, the authentication token from the authentication service;
   saving, by the second application instance, the refreshed authentication token to a memory external to the storage accessible to the plurality of application instances; and
   replacing, by the second application instance, the authentication token in the storage with the authentication token in the memory external to the storage.

7. The non-transitory computer readable medium of claim 1, further comprising:
   in response to determining that the authentication token has not been refreshed, performing, by the first application instance, one or more retries to check the storage to determine whether the authentication token has been refreshed, wherein the performing includes scheduling the one or more retries based on a variable waiting period between the retries.

8. The non-transitory computer readable medium of claim 7, further comprising:
   in response to determining that the authentication token has not been refreshed after performing the one or more retries, returning, by the first application instance, a failure to the browser of the client device for the request to provide content.

9. The non-transitory computer readable medium of claim 1, further comprising:
   in response to determining that the authentication token in the storage is not expired, sending, by a third application instance of the plurality of application instances, the authentication token in the storage with a request for content from the browser of the client device to a backend server; and
   providing, by the third application instance, the requested content from the backend server to the browser of the client device.

10. A non-transitory computer readable medium having program instructions stored thereon that are capable of causing a first application instance of a plurality of application instances instantiated by a server system to perform operations comprising:
   determining whether an authentication token usable by the plurality of application instances to obtain content from a database has expired, wherein the authentication token is maintained in a storage accessible to the plurality of application instances;
in response to determining that the authentication token has expired, sending a refresh request for the authentication token to an authentication service;
in response to determining that the authentication token has not been refreshed by the authentication service, checking the storage to determine whether another instance of the plurality of application instances has stored a refreshed authentication token in the storage;
sending, based on determining that the authentication token has not yet been refreshed by the authentication service, a second refresh request to the authentication service;
comparing a refresh expiration timestamp of a refreshed authentication token received from the authentication service in response to the second refresh request with a stored expiration timestamp of a refreshed authentication token stored by a second application instance in the storage accessible to the plurality of application instances; and
in response to the stored expiration timestamp being later in time than the refreshed expiration timestamp, discarding the refreshed authentication token received from the authentication service based on the second refresh request.

11. The non-transitory computer readable medium of claim 10, wherein the operations further comprise:
in response to determining that no response to the refresh request has been received from the authentication service, sending, by the first application instance, one or more additional refresh requests for the authentication token to the authentication service.

12. The non-transitory computer readable medium of claim 10, wherein sending the refresh request for the authentication token further comprises:
presenting a refresh token, to the authentication service, wherein the refresh token is maintained in the storage accessible to the plurality of application instances.

13. The non-transitory computer readable medium of claim 10, wherein the operations further comprise:
in response to a successful refresh of the authentication token by the authentication service, receiving, by the first application instance, a refreshed authentication token;
saving, by the first application instance, the refreshed authentication token to a memory external to the storage; and
in response to determining that the authentication token in the memory has an expiration time later than the authentication token in the storage, replacing the authentication token in the storage with the authentication token in the memory.

14. The non-transitory computer readable medium of claim 10, wherein the operations further comprise:
in response to a successful refresh of the authentication token by the authentication service, receiving, by the first application instance, a refreshed authentication token;
saving, by the first application instance, the refreshed authentication token to a memory external to the storage; and
in response to determining that the authentication token in the memory has an expiration time earlier than the authentication token in the storage, discarding the authentication token in the memory without replacing the authentication token in the storage.

15. A method comprising:
receiving, by a first application instance of a plurality of instances of an application executing on a server system, a request to perform a service from a browser of a client device;
determining, by the first application instance, that an authentication token useable to provide the service has expired, wherein the authentication token is maintained in a storage accessible to the plurality of application instances;
sending, by the first application instance, a refresh request for the authentication token to an authentication service;
in response to the authentication service denying the refresh request, determining, by the first application instance, whether another instance of the plurality of instances of the application has refreshed the authentication token by checking the storage;
sending, by the first application instance based on determining that the authentication token has not yet been refreshed by the authentication service, a second refresh request to the authentication service;
comparing, by the first application instance, a refresh expiration timestamp of a refreshed authentication token received from the authentication service in response to the second refresh request with a stored expiration timestamp of a refreshed authentication token stored by a second application instance in the storage accessible to the plurality of application instances; and
in response to the refreshed expiration timestamp being earlier in time than the stored expiration timestamp, discarding, by the first application instance, the refreshed authentication token received from the authentication service based on the second refresh request.

16. The method of claim 15, further comprising:
refreshing, by the second application instance of the plurality of application instances, the authentication token with the authentication service;
copying, by the second application instance, the refreshed authentication token into a memory associated with the second application instance and external to the storage accessible to the plurality of application instances; and
replacing, by the second application instance, the authentication token maintained in the storage by the refreshed authentication token.

17. The method of claim 15, further comprising:
in response to determining that the authentication token has been refreshed by another instance of the plurality of instances of the application:
retrieving, by the first application instance, the authentication token from the storage into a memory external to the storage;
sending, by the first application instance, the authentication token in the memory external to the storage to a backend server along with a request to perform the service; and
forwarding, by the first application instance, a result of the performed service received from the backend server to the browser of the client device.

18. The method of claim 15, further comprising:
prior to the first application instance receiving the request for service, receiving the request at a load balancer of the server system; and
determining, by the load balancer, to distribute the request to the first application instance for processing based on a comparison of a workload of the first application instance with workloads of other application instances.

19. The method of claim 15, further comprising:

in response to determining that the authentication token has not been refreshed, performing, by the first application instance, one or more retries to check the storage to determine whether the authentication token has been refreshed, wherein the performing includes varying a particular waiting period between the retries.

20. The method of claim 19, further comprising:

after performing the one or more retries and in response to determining that the authentication token has been refreshed:
- retrieving, by the first application instance, the authentication token from the storage;
- sending, by the first application instance, the retrieved authentication token to a backend server along with a request to perform the service; and
- forwarding, by the first application instance, a result of the performed service received from the backend server to the browser of the client device.

* * * * *